United States Patent Office 3,696,053
Patented Oct. 3, 1972

3,696,053
POROUS SILICA CONTAINING FOREIGN IONS AND METHOD FOR PREPARATION FOR SAME
Madeleine A. Le Page, Paris, Raymond Beau, Massy, and Jacques Duchene, Maison-Alfort, France, assignors to Produits Chimiques Pechiney-Saint-Gobain, Neuilly-sur-Seine, France
No Drawing. Continuation-in-part of application Ser. No. 610,786, Jan. 23, 1967. This application Mar. 18, 1970, Ser. No. 20,850
Int. Cl. B01j *11/82, 11/36*
U.S. Cl. 252—437     20 Claims

ABSTRACT OF THE DISCLOSURE

This invention is addressed to silica gel grains containing foreign ions including an alkali metal cation, wherein the alkali metal is selected from a group consisting of lithium, sodium, potassium and cesium, along with an acidic anion selected from a group consisting of sulfate, phosphate, chloride, bromide and iodide anions, and to methods for their preparation.

---

This is a continuation-in-part of applicant's application, Ser. No. 610,786, filed Jan. 23, 1967, now abandoned.

This invention relates to porous particles of silica containing a specified amount of specific foreign atoms.

Porous particles of different shapes and characteristics have found commercial use, especially in absorption and catalytic processes. Among the porous pieces, use is often made of porous particles of silica in which their specific surfaces and pore dimensions are determined by particular applications.

Aside from natural porous silica, such as diatomaceous earth, the porous silica particles are prepared generally by the precipitation of alkali metal silicates with an acid. Depending somewhat on the process conditions, it is possible to obtain highly divided silica by slow hardening of gels which, when crushed, produce• fragments having a glassy appearance. With regard to such gels, considerable research has been expended towards establishing the conditions for precipitation and subsequent treatment, such as washing where a product of predetermined characteristics can repeatedly be produced.

Gels, and particularly silica gel, can be formed into granules of rounded shape, such as substantially perfect spheres, which exhibit high impact strength and wear resistance by comparison with crushed gel fragments of irregular shapes. Gel grains of spherical shape, which can be produced in dimensions ranging from a fraction to several millimeters, find excellent use in the process which employ moving or fluidized contact beds. The techniques which have been employed in the preparation of such gel globules rely upon the surface tension of the silica sol introduced as droplets into various fluids in which they are maintained until formed to globular shape and solidify sufficiently for manipulation in subsequent treatments, such as washing. Such fabricating techniques, which can be carried out in a continuous fashion, require careful regulation of the conditions for operation, particularly in the reaction conditions of the substances in forming the gelatinizing sols and the thermal condition for gelation so that the droplets will gel into globules within a predetermined length of time.

The grains of silica gel usually employed in commercial practice, whether irregular or round, generally have a large specific surface which often exceeds several hundred m.$^2$/g. and a porosity in which the pores are of some 10 angstroms whereby they find particular use for various absorption systems.

In many applications, change in the general characteristics of the silica gel grains is noticed whereby the optimum conditions for a particular chemical reaction are no longer available with corresponding loss in yield.

It has been found by applicants that the general characteristics developed by the silica gel grains depend somewhat upon the chemical and physical conditions of the medium in which the gel grains are treated and the amount and nature of atoms has an important effect by their interaction with the evolution of the silica gel grains.

The presence of such foreign atoms is particularly important when the grains are used in a catalytic system where they will be exposed to relatively high temperatures sufficient to cause deterioration of the silica gel grains. At such high temperatures, interactions often occur with the catalytic material embodied within the porous carrier and the foreign atoms present in the silica lattice. Such foreign atoms can have catalytic effect by themselves or minimize the inhibition of the chemical reaction catalyst.

In accordance with the practice of the present invention, it has been found that the presence of alkali metal cations in definite amounts in the silica lattice has a material effect on the ultimate evolution of the silica gel grains. In addition, it has been found that the presence of other ions, specifically acidic anions, is very important because of the existence of preferential bonding between the acidic anions and the alkali metal cations present in the lattice or bound to the lattice. Sodium and lithium are preferably employed as the cation component, although many of the improvements secured by the invention are also obtained by the use of potassium or cesium as the cation component. Representative of the acidic anion components which give the desired results are those anions containing phosphorus, sulfur, chlorine, bromine, iodine, and more specifically the phosphate, sulfate, chloride, bromide and iodide anions. It has been found that silica gel grains containing the above ions in the amounts hereinafter described provide a heretofore unobtainable flexibility in a product whose characteristics can be defined almost exclusively in terms of the quantity of cations present in the silica lattice, the quantity of anions present in the silica lattice, calcination temperature and calcination time.

It is accordingly an object of the invention to produce and provide a method for producing, as a new industrial product, silica gel grains which contain definite amounts of foreign atoms, and it is a related object of the invention to produce and provide a method for producing silica gel grains containing alkali metal cations and acidic anions in which the amount of the alkali metal cation calculated has the corresponding oxide ($M_2O$), is within the range of 0.01–10.0% by weight, and the amount of the acid anion is an amount up to 6% by weight, and preferably an amount within the range of 0.1–6.0% by weight.

The amount of the anion component is calculated on the basis of $SO_3$ and $PO_3$ in the case of acid anions containing sulfur and phosphorus, respectively, wherein the halogen anion component is calculated as Cl, Br or I.

In accordance with the preferred practice of the present invention, the cation component is present in an amount in excess of the amount which would be stoichiometrically combined with the anions present in the silica lattice other than the acid radical ions of the hydrated silica. Thus, the anion is preferably present in an amount corresponding to that amount which would be necessary to react with or neutralize at least 10% of the amount of the cation component contained in the silica grains. By the same token, with all of the anion components described above except the phosphate anion, the anion component is preferably present in an amount insufficient to react in stoichiometric proportion with or neutralize all of the alkali metal cation components present. It has been found that best results are generally when the anion component is present in an amount corresponding to the amount necessary to react in stoichiometric proportion with or neutralize between 10–90% by weight of the alkali metal cation components present in the silica gel grains.

Various processes can be used, in accordance with the practice of the invention, to obtain the silica gel grains having a prescribed percentage of foreign ions. For example, the gel grains of the invention can be prepared by washing silica gel grains containing the desired cation and anion components obtained by, for example, coagulation of globules of silica sol in an immiscible liquid or by crushing silica gel masses, with aqueous medium of predetermined pH, under control of time, temperature and agitation in order to carefully control the foreign ion content of the silica gel. The preferred practice of the present invention involves first washing the gel with water at a medium pH, followed by processing with water at an alkaline pH or washing at an acid pH. Such operation can be combined in a continuous or discontinuous process and can be repeated time and time again, preferably with intermediate drying.

The gel grains preferred for use in the practice of the present invention as described above are obtained by reaction of an acid containing the desired anion with an alkali metal silicate, such as sodium silicate or lithium silicate, forming grains by progressive coagulation of globules of silica sol formed in an immiscible fluid, or by crushing masses of silica gel. However, other conventional method for forming the silica gel grains, such as by means of a rotary pan as by extrusion, may be used in lieu of the sol coagulation methods described above.

Alternatively, use can also be made of a silica gel which contains a very low percentage of foreign ions, which can then be impregnated with an aqueous solution containing a predetermined amount of the desired ions. Silica gels containing very low percentages of foreign ions can be prepared by the methods described above wherein the resulting gel is washed in a series of washing steps in order to remove most of the ions present in the gel. In addition, silica gel grains containing a low percentage of foreign metal ions can also be prepared by coagulation of silica sol in the form of grains formed from ethyl or methyl silicate, and preferably formed from ethyl orthosilicate.

The resulting silica gel grains can then be if desired, calcined at a temperature within the range of 400–1000° C., and preferably within the range of 400–800° C. to produce porous silica particles in which the porosity depends almost entirely upon the calcination temperature and the quantity of foreign ions contained in the silica particles.

The following examples which are provided by way of illustration, but not of limitation, illustrate the importance of the quantity of foreign ions contained in the silica grains as well as the effect on the porosity of the various calcination temperatures within the disclosed ranges.

EXAMPLE 1

A hydrated silica sol having pH of 4.6 to 4.8 and containing 100 g./l. of $SiO_2$ is prepared from sodium silicate and sulphuric acid. The sol is coagulated to form globules at 70° C. for 25 to 30 seconds in a water immiscible liquid, as described in U.S. Pats. Nos. 2,384,943, 2,384,944, 2,384,945 and 2,385,217. After washing and drying, globules of 2 to 6 mm. are obtained. The washing of the globules is achieved by slow agitation at room temperature in an open container for two hours with hydrochloric acid added in an amount to provide a pH of 2 and which is maintained at the designated pH by additions of 1 N hydrochloric acid. The washing operation is repeated four times. The washed globules are slowly dried in a drying oven and the globules have the following chemical analysis: 3.29% by weight in $SO_3$ and 3.04% by weight in $Na_2O$. The latter amounts to an excess of $Na_2O$ with reference to the combined amount with $SO_3$ of 0.49% by weight of gel.

EXAMPLE 2

Hydrogel globules prepared as in Example 1, having a diameter within the range of 0.2 to 1.25 mm. are washed at ordinary temperature three times with distilled water, once with an ammonium solution having a pH of 9.5 in which the pH is maintained by the addition of normal ammonia solution. The globules, dried as in Example 1, are analyzed to contain 2.93% by weight $SO_3$ and 3.88% by weight $Na_2O$. The amount of $Na_2O$ corresponds to an excess relative to the combined quantity of $SO_3$ of 1.61% by weight of the gel.

EXAMPLE 3

With grains prepared as in Example 1, the washings are carried out with HCl solution maintained at a pH of 2 with the globules being the same as those in Example 1 except that the globules are washed six times with the volume of wash solution per volume of hydrogel being 1.5. The dried globules are analyzed to have 0.64% by weight $SO_3$ and 0.47% by weight $Na_2O$. The amount of $Na_2O$ corresponds to an excess over the combined quantity with $SO_3$ of 0.12% by weight of the gel.

EXAMPLE 4

With globules obtained as in the preceding examples, but having a diameter of 1 to 5 mm., three separate series of five washings are made; in each of the series, four washings are made with one volume of distilled water per volume of hydrogel, and the last washing of each of the three series is carried at constant pH of 8, 8.6 and 9 by means of adjustment with a volume of ammonium solution. The quantity of $SO_3$ and $Na_2O$, as well as the excess of $Na_2O$ present in percent by weight of the gel in the dry globules are set forth in the following table:

TABLE I

| | $SO_3$ | $Na_2O$ | Excess of $Na_2O$, percent by weight of gel |
|---|---|---|---|
| First series—1 washing at pH 8, percent | 2.45 | 2.36 | 0.46 |
| Second series—1 washing at pH 8.6, percent | 1.92 | 2.20 | 0.72 |
| Third series—1 washing at pH 9, percent | 1.63 | 2.11 | 0.85 |

EXAMPLE 5

Proceeding as in the previous examples, but with hydrogel globules of 1.25 to 4 mm. in diameter, three series of six washings are made in the proportion of 1.5 volumes of washing liquid per volume of hydrogel with the first five washings of each series being carried out with distilled water while the last of each series is with an alkaline solution. The values of $SO_3$, $Na_2O$ and excess $Na_2O$ for the dried globules are as follows:

TABLE II

|  | $SO_3$ | $Na_2O$ | Excess of $Na_2O$, percent by weight of gel |
|---|---|---|---|
| First series—1 washing at pH 8.5, percent | 0.19 | 0.40 | 0.25 |
| Second series—1 washing at pH 9, percent | 0.12 | 0.68 | 0.60 |
| Third series—1 washing at pH 9.5, percent | 0.12 | 0.88 | 0.80 |

EXAMPLE 6

Dry globules having a diameter within the range of 40 to 300 m$\mu$ are obtained by dispersing an acid sol having 100 g./l. of $SiO_2$ in a water immiscible liquid at 70° C. Six washings are employed with de-ionized water circulated by means of a pump through a mass of wet globules in the proportion of 1.5 volumes of water per volume of hydrogel in each washing. A seventh washing with an ammonia solution having a pH of 8.5 is employed. The washed particles are dried at 120° C. for 48 hours in a plate drying oven and then washed twice in a centrifugal drier with three volumes per volume of silica of a pH 2 solution and then five times in the same manner with de-ionized water. The analysis gives an amount of $Na_2O$ after drying of 0.04%.

EXAMPLE 7

This example illustrates that the impregnation of a silica gel with an acid salt which is extremely stable at temperatures above 600° C. does not result in silica gel grains having narrow porosities which can be varied by calcination of the impregnated silica gel by variation in the calcination temperature.

In this example, the dry silica gel balls having the characteristics indicated below are impregnated with sodium sulfate.

| | |
|---|---|
| Granulometry | 100–300 microns. |
| Chemical composition | .02 moles $Na_2SO_4$ per 100 moles $SiO_2$. |
| Specific surface | 490 square meters/gram. |
| Porous volume | 78 cc./gram. |
| Average pore diameter | 64 A. |

The dry silica gel balls having the above characteristics are impregnated with sodium sulfate in order to incorporate varying amounts of sodium and sulfate ions in the silica gel balls. After impregnation, the impregnated balls are dried at 120° C., calcined under air for one hour at temperatures varying between 400–1000° C. The results, which are compiled in Table III illustrate that, for silicas containing between 0.6–5.2 moles of sodium sulfate per 100 moles $SiO_2$, calcination causes a simultaneous decrease in the specific surface S and in the porous volume V with increasing calcination temperatures, but no change in the distribution of the pores.

TABLE III

| Chemical composition of the products impregnated and dried at 120° C. | | | Textural characteristics of the products after calcination | | | |
|---|---|---|---|---|---|---|
| Sodium sulfate in $Na_2O$, moles | Silica in $SiO_2$, moles | Calcination temperature, ° C. | S, m.²/gram | V, cc./gram | Diameter $\Phi_M$, A. | Distribution of pores |
| 0.6 | 100 | 120 | 504 | .75 | 60 | From 50 to 150 A. |
|  |  | 400 | 466 | .75 | 64 | Do. |
|  |  | 600 | 534 | .74 | 56 | Do. |
|  |  | 700 | 430 | .69 | 64 | Do. |
|  |  | 800 | 393 | .60 | 68 | Do. |
|  |  | 900 | 122 | .25 | 82 | Do. |
|  |  | 1,000 | 0.1 | 0 |  | No porosity |
| 1.2 | 100 | 120 | 453 | .73 | 64 | From 50 to 150 A. |
|  |  | 600 | 460 | .72 | 62 | Do. |
|  |  | 700 | 425 | .69 | 64 | Do. |
|  |  | 800 | 395 | .60 | 62 | Do. |
|  |  | 900 | 118 | .30 | 102 | Do. |
|  |  | 1,000 | 0.2 | 0 |  | No porosity |
| 3.7 | 100 | 400 | 426 | .68 | 64 | From 50 to 150A. |
|  |  | 600 | 428 | .66 | 62 | Do. |
|  |  | 700 | 412 | .63 | 62 | Do. |
|  |  | 800 | 360 | .56 | 62 | Do. |
|  |  | 900 | 63 | .22 | 140 | Do. |
|  |  | 1,000 | 1.5 | .04 |  | Negligible porosity |
| 5.2 | 100 | 120 | 413 | .65 | 64 | From 50 to 150 A. |
|  |  | 600 | 443 | .64 | 58 | Do. |
|  |  | 700 | 426 | .62 | 58 | Do. |
|  |  | 800 | 358 | .55 | 62 | Do. |
|  |  | 1,000 | 2.3 | .10 | 90 | Do. |

NOTES.—S=specific surface; V=porous volume; $\Phi_M$=average pore diameter.

EXAMPLE 8

This example illustrates that it is not possible to obtain products having varying porosities at calcination temperatures between 600–1000° C. by use of a silica impregnated with sodium trisilicate.

In this example, the silica balls utilized in Example 7 are impregnated with varying amounts of sodium trisilicate and dried at a temperature of 120° C. Thereafter, the impregnated silica balls are calcined under air for 1 hour at temperatures within the range of 400–900° C.

The characteristics of the resulting silicas, which are compiled in Table IV, illustrate that the specific surface distribution drops at calcination temperatures above 750–800° C. The porous volume at these calcination temperatures becomes negligible and the corresponding products are very friable. In addition, the pore distribution is unchanged by the use of varying calcination temperatures.

TABLE IV

| Chemical composition of the products impregnated and dried at 120° C. | | | Textural characteristics of the products after calcination | | | |
|---|---|---|---|---|---|---|
| Sodium trisilicate in Na₂O, moles | Silica in SiO₂, moles | Calcination temperature, °C. | S, m.²/gram | V, cc./gram | $\phi_M$, A. | Distribution of pores. |
| 0.5 | 100 | 120 | 284 | .76 | 108 | From 60 to 200 A. |
|  |  | 400 | 248 | .74 | 120 | Do. |
|  |  | 600 | 250 | .74 | 118 | Do. |
|  |  | 700 | 174 | .70 | 160 | Do. |
|  |  | 800 | 144 | .53 | 148 | Do. |
|  |  | 900 | 43 | .26 | 120 | Do. |
| 0.9 | 100 | 120 | 250 | .74 | 120 | From 70 to 200 A. |
|  |  | 400 | 265 | .77 | 116 | Do. |
|  |  | 600 | 214 | .70 | 130 | Do. |
|  |  | 700 | 174 | .65 | 150 | Do. |
|  |  | 800 | 51 | .52 | 220 | From 100 to 300 A. |
|  |  | 900 | 0.3 | .02 |  | Negligible porosity |
| 3.2 | 100 | 120 | 70 | .48 | 300 | From 200 to 400 A. |
|  |  | 400 | 100 | .52 | 208 | Do. |
|  |  | 600 | 85 | 55 | 260 | Do. |
|  |  | 700 | 36 | .50 | 400 | From 300 to 500 A. |
|  |  | 800 | 0.8 | .03 |  | Negligible porosity |
|  |  | 900 | 0.6 | 0 |  | No porosity |
| 4.1 | 100 | 120 | 65 | .41 | 280 | From 200 to 350 A. |
|  |  | 400 | 90 | .48 | 210 | Do. |
|  |  | 600 | 85 | .43 | 200 | Do. |
|  |  | 700 | 30 | .37 | 320 | Do. |
|  |  | 800 | 0.3 | Negligible porosity | (¹). |  |
|  |  | 900 | 0.4 | Negligible prosoity | (¹). |  |

¹ NOTE.—These products are extremely friable.

EXAMPLE 9

This example illustrates that the simultaneous presence of a strong acid salt which is stable at high temperatures (Na₂SO₄) and of "free Na₂O" (incorporated in the gel by impregnation with sodium trisilicate) in a silica gel makes it possible to obtain silicas having a narrow range in pore distribution which can be varied by varying the calcination temperature.

In this example, the silica gel balls utilized in Example 7 are subjected to two impregnations, the first with sodium sulfate and the second with sodium trisilicate, in order to incorporate varying amounts of the sodium sulfate and sodium trisilicate in the impregnated balls. After impregnation, the impregnated balls are dried at a temperature of 120° C., and are thereafter calcined under air for one hour at varying temperatures within the range of 400–1000° C.

The characteristics of the resulting silica balls, which are tabulated in Table V, reveal that for certain chemical composition, an increase in the calcination temperature causes a simultaneous decrease in the specific surface and the porous volume. It will be noted, however, that the porous volume decreases in an amount proportionately less than the amount of the decrease in the specific surface. There is thus obtained a clear shifting in the pore distribution in that the average diameter of the pores $\phi$ increases yet the product maintains a significant porous volume. It will also be noted that as the Na₂O (sulfate)—Na₂O(trisilicate) ratio exceeds 1, a product having a higher porous volume is produced.

EXAMPLE 10

This example, which is similar to Example 9, is carried out on silica gel grains obtained by extrusion in order to demonstrate that the form in which the silica gel grains are prepared does not alter the results.

The silica extrusion employed in this example is obtained from hydrogen micro balls and have the following characteristics:

Diameter of extruded products _. 5 mm.
Chemical composition _____ .06 moles Na₂O (originating from sulfate) 100 moles SiO₂.
Specific surface _____ 350 m.²/gram.
Porous volume _____ .95 cc./gram.
Average pore diameter _____ 109 A.

The silica gel grains prepared by extrusion are dried at a temperature of 200° C. after impregnation with a mixture of sodium sulfate and sodium trisilicate. Thereafter, the impregnated grains are calcined for three hours under air at temperatures between 700–900° C.

The characteristics of the resulting silicas are shown in Table VI, and clearly illustrates that the simultaneous presence of sodium sulfate and sodium trisilicate in the silica gel makes it possible to obtain a product having a narrow range in pore distribution which can be varied by variation in the calcination temperature. As is illustrated in this table, at a calcination temperature of 900° C., the average diameter of the pores may reach 10000 A. In addition, this example illustrates that an excess in

TABLE V

| Chemical composition of the products impregnated and dried at 120°C. | | | | | Textural characteristics of the products after | | | |
|---|---|---|---|---|---|---|---|---|
| Total sodium in Na₂O, moles | Sodium sulfate in Na₂O, moles | Sodium trisilicate in Na₂O, moles | Silica in SiO₂, moles | Calcination temperature, °C. | S, m.²/gram | V, cc./gr. | $\phi_M$, A. | Distribution of pores |
| 4.6 | 1.3 | 3.3 | 100 | 120 | 73 | .49 | 270 | From 150 to 500 A. |
|  |  |  |  | 400 | 78 | .53 | 264 | Do. |
|  |  |  |  | 600 | 78 | .50 | 258 | Do. |
|  |  |  |  | 700 | 20 | .44 | 640 | From 500 to 1,000 A. |
|  |  |  |  | 800 | 1.3 | .24 | 4,000 | From 2,400–8,000 A. |
|  |  |  |  | 900 | .7 | .23 | 7,200 | From 5,000–12,000 A. |
| 4.0 | 2.6 | 1.4 | 100 | 120 | 163 | .67 | 164 | From 100 to 350 A. |
|  |  |  |  | 400 | 165 | .67 | 164 | Do. |
|  |  |  |  | 600 | 152 | .64 | 168 | Do. |
|  |  |  |  | 700 | 120 | .60 | 200 | Do. |
|  |  |  |  | 800 | 30 | .53 | 710 | From 300 to 1,000 A. |
|  |  |  |  | 900 | 2.6 | .43 | 4,000 | From 3,000–7,000 A. |
|  |  |  |  | 1,000 | 1.7 | .42 | 6,200 | From 5,000 to 13,000 A. | the amount of sodium sulfate relative to the amount of sodium trisilicate provides a product of higher porous volume.

gel micro balls are calcined under air for 1 hour at temperatures between 600–900° C.
temperature of 120° C. Thereafter, the impregnated silica

TABLE VI

| | Chemical composition of the products impregnated and dried at 120° C. | | | | Textural characteristics of the products after | | | |
|---|---|---|---|---|---|---|---|---|
| Total sodium in Na₂O, moles | Sodium sulfate in Na₂O, moles | Sodium trisilicate in Na₂O, moles | Silica in SiO₂, moles | Calcination temperature, °C. | $S$, m.²/gram | $V$, cc./gr. | $\phi_M$, A. | Distribution of pores |
| 3.0 | .5 | 2.5 | 100 | 200 | 150 | .66 | 176 | From 80 to 300 A. |
| | | | | 700 | 65 | .41 | 250 | From 100 to 800 A. |
| | | | | 800 | 13 | .30 | 2,000 | From 400 to 3,000 A. |
| | | | | 900 | .3 | .15 | 10,000 | From 5,000 to 20,000 A. |
| 2.7 | 1.5 | 1.2 | 100 | 200 | 223 | .77 | 138 | From 70 to 200 A. |
| | | | | 700 | 166 | .62 | 150 | From 80 to 250 A. |
| | | | | 800 | 86 | .52 | 1,010 | From 400 to 2,000 A. |
| | | | | 900 | 3 | .39 | 3,800 | From 1,600 to 7,000 A. |
| 3.8 | 2.5 | 1.3 | 100 | 200 | 270 | .78 | 116 | From 90 to 300 A. |
| | | | | 700 | 200 | .61 | 122 | Do. |
| | | | | 800 | 65 | .57 | 700 | From 200 to 1,400 A. |
| | | | | 900 | 3.7 | .45 | 3,200 | From 2,000 to 5,000 A. |

EXAMPLE 11

This example illustrates that other acidic anions can be employed in lieu of the sulfate anions used in the preceding examples.

In this example, the silica gel micro balls used in Examples 7–9 are impregnated with sodium chloride and sodium trisilicate in varying proportions, and dried at a temperature of 120° C. Thereafter, the impregnated balls are calcined under air for 1 hour at temperatures between 700–900° C.

The characteristics of the resulting silica, tabulated in Table VII, illustrate a decrease in the specific surface and the porous volume when the calcination temperature exceed 600° C. This effect is accompanied by a significant shift in the distribution of the pore sizes.

Similarly, calcinations effected at intermediate temperatures between 700–900° C. make it possible to obtain a product having a complete range of distribution of pore diameter between 300–700° A.

The characteristics of the resulting calcined silica gel grains are shown in Table VIII, which indicates that silicas having a narrow range in pore distribution which can be varied by varying the calcination temperature can be produced by calcinating silica grains containing trisodium phosphate and sodium trisilicate.

TABLE VIII

| | Chemical composition of the products impregnated and dried at 120° C | | | | Textural characteristics of the products after calcination | | | |
|---|---|---|---|---|---|---|---|---|
| Total sodium in Na₂O, moles | Na₃PO₄ in Na₂O moles | Sodium trisilicate in Na₂O moles | SiO₂ in moles | Calcination temperature, °C. | $S$, m.²/g. | $V$, cc./gr. | $\phi_M$, A. | Distribution of pores |
| 4.8 | 1.5 | 3.3 | 100 | 120 | 41 | .50 | 488 | From 200 to 600 A. |
| | | | | 600 | 50 | .48 | 400 | From 200 to 600 A. |
| | | | | 700 | 22 | .47 | 860 | From 400 to 1,000 A. |
| | | | | 800 | 1.2 | .14 | 4,700 | From 500 to 5,400 A. |
| | | | | 900 | .4 | .17 | 12,000 | From 4,000 to 14,000 A. |
| 7.5 | 4.2 | 3.3 | 100 | 600 | 40 | .45 | 340 | From 100 to 500 A. |
| | | | | 800 | 1.5 | .23 | 4,400 | From 2,500 to 6,000 A. |
| | | | | 900 | .8 | .17 | 6,600 | From 3,000 to 9,500 A. |

EXAMPLE 13

This example illustrates that the amount of phosphate anions present in the silica gel can be an amount corresponding to the amount of the phosphate which would be stoichiometrically combined with the sodium cations contained in the gel.

In this example, the micro balls utilized in Example 12 are impregnated in the same manner as Example 12 except that the sodium trisilicate is omitted from the impregnating mixture.

The properties of the resulting calcined silica gel grains are shown in Table IX, which indicates that very large

TABLE VII

| | Chemical composition of the products impregnated and dried at 120° C. | | | | Textural characteristics of the products after calcination | | | |
|---|---|---|---|---|---|---|---|---|
| Total sodium in Na₂O, moles | Sodium chloride in Na₂O, moles | Sodium trisilicate in Na₂O, moles | Silica in SiO₂, moles | Calcination temperature, °C. | $S$, m.²/gram | $V$, cc./gr. | $\phi_M$, A. | Distribution of pores |
| 4.2 | 3.1 | 1.1 | 100 | 700 | 75 | .62 | 360 | From 150 to 600 A. |
| | | | | 800 | 15 | .64 | 1,160 | From 700 to 2,000 A. |
| | | | | 900 | 2.4 | .52 | 6,000 | From 4,000–8,000 A. |
| 7.4 | 5.4 | 2.0 | 100 | 120 | 222 | .70 | 126 | From 80 to 300 A. |
| | | | | 700 | 87 | .63 | 320 | From 200 to 700 A. |
| | | | | 800 | 5.3 | .55 | 3,000 | From 1,000 to 5,000 A. |
| | | | | 900 | 2.3 | .55 | 7,000 | From 5,000 to 10,000 A. |

EXAMPLE 12

This example illustrates the use of a salt containing sodium cations and phosphate anions.

In this example, the silica gel micro balls used in Example 7 are impregnated with mixtures of trisodium phosphate and sodium trisilicate, and then dried at a pores are obtained at calcination temperatures of 900° C. At the same time, the calcination temperatures between 600–800° C. the shifting of the distribution of the pore diameter is relatively slight in that there is a small increase in the average pore diameter as the calcination temperature increases from 600 to 800° C.

TABLE IX

| Chemical composition of the products impregnated and dried at 120° C. | | | | | Textural characteristics of the products after calcination | | | |
|---|---|---|---|---|---|---|---|---|
| Total sodium in Na₂O, moles | Na₃PO₄ in Na₂O, moles | Sodium trisilicate in Na₂O, moles | SiO₂ in moles | Calcination temperature, ° C. | S, m.²/g. | V, cc./gr. | $\phi_M$, A. | Distribution of pores |
| 1.4 | 1.2 | | 100 | 120 | 292 | .75 | 102 | From 70 to 300 A. |
| | | | | 600 | 258 | .72 | 112 | From 70 to 300 A. |
| | | | | 700 | 247 | .66 | 108 | From 70 to 300 A. |
| | | | | 800 | 74 | .31 | 128 | Form 70 to 300 A. |
| | | | | 900 | 10 | .45 | 1,800 | From 800 to 3,000 A. |
| 4.0 | | 3.6 | 100 | 120 | 190 | .71 | 150 | From 70 to 300 A. |
| | | | | 600 | 160 | .67 | 168 | From 70 to 300 A. |
| | | | | 700 | 87 | .59 | 272 | From 150 to 400 A. |
| | | | | 800 | 38 | .34 | 360 | From 200 to 500 A. |
| | | | | 900 | 4.6 | .48 | 4,200 | From 1,800 to 7,000 A. |
| 8.8 | | 8.1 | 100 | 120 | 76 | .48 | 252 | From 150 to 400 A. |
| | | | | 400 | 80 | .51 | 256 | From 150 to 400 A. |
| | | | | 600 | 73 | .50 | 274 | From 150 to 400 A. |
| | | | | 700 | 42 | .36 | 335 | From 250 to 500 A. |
| | | | | 900 | 2.1 | .35 | 6,600 | From 3,000 to 10,000 A. |

EXAMPLE 14

This example illustrates that lithium cations can be used in lieu of sodium cations to produce a silica gel having a narrow range in pore distribution which can be varied by use of calcination temperatures above 600° C.

In this example, the silica gel micro balls used in the preceding examples are impregnated with a mixture of lithium oxide or lithium sulfate, followed by drying at 120° C. Thereafter, the resulting impregnated silica gel grains are calcined at 800° and 900° C. for one hour under air.

The characteristics of the resulting calcined silica gel micro balls are tabulated in Table X, which indicates that the use of lithium cations provide a calcined silica gel having large diameters and large porous volumes.

TABLE X

| Chemical composition of the products impregnated and dried at 120° C. | | | | | Textural characteristics of the products after calcination | | | |
|---|---|---|---|---|---|---|---|---|
| Total lithium in Li₂O, moles | Lithium sulfate in Li₂O, moles | Lithium oxide in Li₂O, moles | SiO₂ in moles | Calcination temperature, ° C. | S, m.²/g. | V, cc./gr. | $\phi_M$, A. | Distribution of pores |
| 5.5 | 3.3 | 2.2 | 100 | 120 | 208 | .66 | 127 | From 80 to 300 A. |
| | | | | 800 | 5.4 | .55 | 2,700 | From 1,500 to 4,000 A. |
| | | | | 900 | 2.2 | .48 | 7,000 | From 5,000 to 10,000 A. |

EXAMPLE 15

This example illustrates that the use of potassium cations in lieu of sodium or lithium cations as described in the previous examples, results in a silica having a less complete range of porosities as the silicas prepared in Examples 9–14.

In this example the silica gel micro balls utilized in the preceding examples are impregnated with a mixture of potassium sulfate and potassium silicate, and then dried at 120° C. Thereafter, the impregnated silica gel grains are calcined at various temperatures for one hour.

The results of this example are tabulated in Table XI which indicates that the average diameter of the pores does not exceed 500 A. for any calcination temperature. At calcination temperatures of 800° and 900° C. the porosity completely disappears.

TABLE XI

| Chemical composition of the products impregnated and dried at 120° C. | | | | | Textural characteristics of the products after calcination | | | |
|---|---|---|---|---|---|---|---|---|
| Total potassium in K₂O, moles | Potassium sulfate in K₂O, moles | Potassium silicate in K₂O, moles | SiO₂ in moles | Calcination temperature, ° C. | S, m.²/g. | V, cc./gr. | $\phi_M$, A. | Distribution of pores |
| 1.6 | 1.0 | .6 | 100 | 120 | 172 | .73 | 170 | From 100 to 300 A. |
| | | | | 600 | 162 | .73 | 180 | Do. |
| | | | | 700 | 120 | .67 | 224 | From 150 to 300 A. |
| | | | | 800 | 74 | .59 | 320 | From 200 to 400 A. |
| | | | | 900 | .7 | .08 | | Negligible porosity |
| | | | | 1,000 | <0.1 | 0 | | No porosity |
| | | | | 1,100 | <0.1 | 0 | | No porosity |
| 2.2 | 0.4 | 1.8 | 100 | 600 | 59 | .61 | 413 | From 250 to 500 A. |
| | | | | 700 | 34 | .42 | 490 | From 300 to 600 A. |
| | | | | 800 | .1 | .01 | | Negligible porosity |
| | | | | 900 | <0.01 | 0 | | No porosity |
| | | | | 1,000 | <0.01 | 0 | | No porosity |
| 5.2 | 3.4 | 1.8 | 100 | 120 | 207 | .65 | 125 | From 75 to 300 A. |
| | | | | 800 | 13 | .25 | 510 | From 300 to 700 A. |
| | | | | 900 | <0.1 | .01 | | Negligible porosity |

EXAMPLE 16

The example illustrates that the use of cesium cations provides results which are comparable to the use of potassium cations as described in Example 15.

In this example, the silica gel micro balls used in the preceding examples are impregnated with a mixture of cesium oxide and cesium sulfate, and are thereafter dried and calcined at various temperatures.

The characteristics of the resulting calcined silica gel micro balls are shown in Table XII, which indicates that there is a slight increase in the average pore diameter but that the diameter does not exceed 270° A.

TABLE XII

| Chemical composition of the products impregnated and dried at 120° C. | | | | | Textural characteristics of the products after calcination | | | |
|---|---|---|---|---|---|---|---|---|
| Total cesium in Cs₂O, moles | Cesium sulfate in Cs₂O, moles | Cesium oxide in Cs₂O, moles | SiO₂ in moles | Calcination temperature, °C. | S, m.²/g. | V, cc./gr. | $\varphi_M$, A. | Distribution of pores |
| 2.5 | 1.5 | 1.0 | 100 | 120 | 244 | .67 | 110 | From 70 to 200 A. |
|  |  |  |  | 800 | 58 | .54 | 270 | From 200 to 400 A. |
|  |  |  |  | 900 | .1 | 0 |  | No porosity. |

It will be apparent from the foregoing that we have provided new and improved silica grains which can be calcined at temperatures within the range of 400–1000° C. to provide calcined silica grains having a narrow range of pore distribution which can be varied by varying the calcination temperatures.

It will be understood that various changes can be made in the details of formulation, procedure and use without departing from the spirit of the invention, especially as defined in the following claims.

We claim:

1. Silica gel grains containing alkali metal cations selected from the group consisting of lithium, sodium, potassium and cesium cations, said cations being present in an amount within the range of 0.01–10% by weight, calculated as $M_2O$, and acidic anions selected from the group consisting of sulfate, phosphate, bromide, chloride and iodide anions, acidic anions being present within the range of 0.01–6% by weight, which have been calcined at a temperature within the range of 400 to 1000° C. to provide a porosity within the range of 0.03 to 0.75 cc./g.

2. Silica gel grains as defined in claim 1 wherein said anion is a sulfate anion.

3. Silica gel grains as defined in claim 1 wherein the cation is present in an amount in excess of the amount which would be stoichiometrically combined with the anion present.

4. Silica gel grains as defined in claim 1 wherein said cation is selected from the group consisting of lithium and sodium cations.

5. Silica gel grains as defined in claim 4 wherein the anion is present in an amount which would stoichiometrically combine with at least 10% of the cation present.

6. Silica gel grains as defined in claim 1 wherein the anion is present in an amount which would be stoichiometrically combined with between 10–90% of the cations present.

7. Silica gel grains as defined in claim 1 wherein said anion is a phosphate anion and is present in an amount up to the amount which would be stoichiometrically combined with all of the cations present in the silica grains.

8. In a process for the preparation of silica gel grains having a controlled porosity, the improvement comprising forming silica gel grains containing alkali metal cations selected from the group consisting of lithium, sodium, potassium and cesium cations, and acidic anions selected from the group consisting of sulfate, phosphate, bromide, chloride and iodide ions, then washing the grains with water followed by washing with water at an alkaline pH or water at an acid pH to adjust the content of cation to within the range of 0.01 to 10% by weight and the content of anions to within the range of 0.01 to 6% by weight and calcining the grains at a temperature within the range of 400° to 100° C. to adjust the porosity of the grains to within the range of 0.03 to 0.75 cc./g.

9. A process as defined in claim 8 wherein the silica gel grains are formed by reacting a silicate of said cation with an acid containing said anions.

10. A process as defined in claim 9 wherein said acid is sulfuric acid.

11. A process as defined in claim 8 in which the washing constitutes a series of separate washing steps with aqueous medium.

12. A process as defined in claim 11 in which the series of washing steps are carried out as a continuous operation.

13. A process as defined in claim 11 in which the series of washing steps are discontinuous.

14. A process as defined in claim 13 which includes the step of an intermediate drying between each washing.

15. A process as defined in claim 8 in which the silica gel grains are washed with an aqueous medium maintained on the acid side.

16. A process as defined in claim 8 in which the silica gel grains are washed with an aqueous medium at neutral pH.

17. A process as defined in claim 16 in which the pH of the acidic aqueous washing solution is maintained at about pH 2.

18. A process as defined in claim 8 in which the aqueous medium is maintained at an alkaline pH.

19. A process as defined in claim 8 in which the washing comprises a series of washes with water at a neutral pH followed by one or more washes with an aqueous alkaline solution.

20. A process as defined in claim 8 wherein the silica gel grains are formed by the coagulation of a silica sol.

References Cited

UNITED STATES PATENTS

| | | | |
|---|---|---|---|
| 1,935,188 | 11/1933 | Latshaw et al. | 252—451 X |
| 2,147,985 | 2/1939 | McKinney | 252—451 |
| 2,384,943 | 9/1945 | Marisic | 252—448 |
| 3,085,861 | 4/1963 | Thornhill et al. | 23—182 |
| 3,346,335 | 10/1967 | Schnurch et al. | 23—182 X |
| 3,321,276 | 5/1967 | Burzynski et al. | 23—182 |

CARL F. DEES, Primary Examiner

U.S. Cl. X.R.

252—440, 441, 451, 454

UNITED STATES PATENT OFFICE

CERTIFICATE OF CORRECTION

Patent No. 3,696,053  Dated October 3, 1972

Madeleine A. Le Page and Jacques Duchene

It is certified that errors appear in the above identified patent and that said Letters Patent are hereby corrected as shown below:

Column 1, line 53, change "process" to -- processes --

Column 8, Table V, in the heading, after "after" please insert -- calcination --

Column 10, cancel lines 1-3 and insert therefor the following: -- temperature of 120°C. Thereafter, the impregnated silica gel micro balls are calcined under air for 1 hour at temperatures between 600-900°C. --

Column 10, Table VI, in the heading, after "after" please insert -- calcination --

Signed and sealed this 3rd day of April 1973.

(SEAL)
Attest:

EDWARD M. FLETCHER, JR.
Attesting Officer

ROBERT GOTTSCHALK
Commissioner of Patents